(12) United States Patent
Ji et al.

(10) Patent No.: US 9,091,787 B2
(45) Date of Patent: Jul. 28, 2015

(54) SEPARATION OF SIMULTANEOUS SOURCE DATA

(75) Inventors: Ying Ji, Cambridge (GB); Julian Edward Kragh, Finchingfield (GB); Philip A. F. Christie, Fen Drayton (GB)

(73) Assignee: WesternGeco L.L.C., Houston, TX (US)

( * ) Notice: Subject to any disclaimer, the term of this patent is extended or adjusted under 35 U.S.C. 154(b) by 867 days.

(21) Appl. No.: 13/305,234

(22) Filed: Nov. 28, 2011

(65) Prior Publication Data

US 2013/0135965 A1     May 30, 2013

(51) Int. Cl.
*G01V 1/38* (2006.01)
*G01V 1/28* (2006.01)
*G01V 1/36* (2006.01)

(52) U.S. Cl.
CPC .............. *G01V 1/364* (2013.01); *G01V 1/3808* (2013.01)

(58) Field of Classification Search
CPC ............................. G01V 1/364; G01V 1/3808
USPC ....................................................... 367/21, 38
See application file for complete search history.

(56) References Cited

U.S. PATENT DOCUMENTS

| | | |
|---|---|---|
| 2009/0168600 A1 | 7/2009 | Moore et al. |
| 2010/0014381 A1 | 1/2010 | Beasley et al. |
| 2010/0039894 A1 | 2/2010 | Abma |
| 2010/0097885 A1 | 4/2010 | Moore |
| 2010/0097888 A1* | 4/2010 | Neelamani et al. ............. 367/38 |
| 2010/0182873 A1 | 7/2010 | Kluver |
| 2010/0271904 A1 | 10/2010 | Moore et al. |
| 2011/0141848 A1 | 6/2011 | Beasley et al. |

FOREIGN PATENT DOCUMENTS

EP         884608         12/2008

OTHER PUBLICATIONS

Jang et al., "A Maximum Likelihood Approach to Single-channel Source Separation" Journal of Machine Learning Research 4 (Dec. 2003) pp. 1365-1392.*
Moore et al: "Simultaneous source separation using dithered sources", SEG (Society of Exploration Geophysicists) Annual Meeting, Las Vegas, 2008, pp. 2806-2810.
International Search Report and Written Opinion of PCT Application No. PCT/IB2012/056768 dated Apr. 23, 2013: pp. 1-19.

* cited by examiner

*Primary Examiner* — Ian J Lobo

(57) ABSTRACT

Generating an image of an interior of the Earth from a seismic survey using multiple sources. The multiple sources may be fired simultaneously and the data received by seismic sensors in the seismic survey may be decomposed so that seismic data generated by each of the multiple sources may be determined. Decomposing of the received data may be performed using frequency diverse basis functions and converting the data separation problem into an optimization problem, which can be a one-norm or zero-norm optimization problem in frequency-space domain. The decomposed data may be used to generate the image of the Earth's interior.

19 Claims, 7 Drawing Sheets

3(e)

3(f)

3(g)

3(h)

SEPARATION OF SIMULTANEOUS SOURCE DATA

BACKGROUND

This disclosure relates to seismic exploration for oil and gas and, in particular but not by way of limitation, relates to seismic data processing for the separation of data recorded from different sources.

Seismic exploration involves surveying subterranean geological formations for hydrocarbon deposits. A survey may involve deploying seismic source(s) and seismic sensors at predetermined locations. The sources generate seismic waves, which propagate into the geological formations, creating pressure changes and vibrations along the way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others are sensitive to particle motion (e.g., geophones); industrial surveys may deploy one type of sensor or both types. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may not only be conducted in saltwater environments, but also in fresh and brackish waters. In one type of marine survey, called a "towed-array" survey, an array of seismic sensor-containing streamers and sources is towed behind a survey vessel. Other surveys are known as "land" surveys because they are conducted on land environments. Land surveys may use dynamite or seismic vibrators as sources. Arrays of seismic sensor-containing cables are laid on the ground to receive seismic signals. The seismic signals may be converted, digitized, stored or transmitted by sensors to data storage and/or processing facilities nearby, e.g., a recording truck. Land surveys may also use wireless receivers to avoid the limitations of cables. Seismic surveys may be conducted in areas between land and sea, which is referred to as the "transition zone." Other surveys, incorporating both hydrophones and geophones, may be conducted on the seabed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure relates to methods and apparatuses for processing composite seismic data obtained by using two or more seismic sources. The methods or apparatuses separate the composite seismic data derived from the two or more sources into individual data sets, each set containing responses to/data relating to an individual source. The methods may work with both aliased and un-aliased data. The methods use the combination of array responses or steering vectors at different frequencies to suppress the spatial aliasing and convert the data separation problem into a one-norm ($l_1$) or zero-norm ($l_0$) optimization problem, the solution of which is the decomposed data associated with each source.

BRIEF DESCRIPTION OF DRAWINGS

Embodiments of this disclosure are described with reference to the following figures. The same numbers are used throughout the figures to reference like features and components. A better understanding of the methods or apparatuses can be had when the following detailed description of the several embodiments is considered in conjunction with the following drawings, in which.

DETAILED DESCRIPTION

Figure 1:
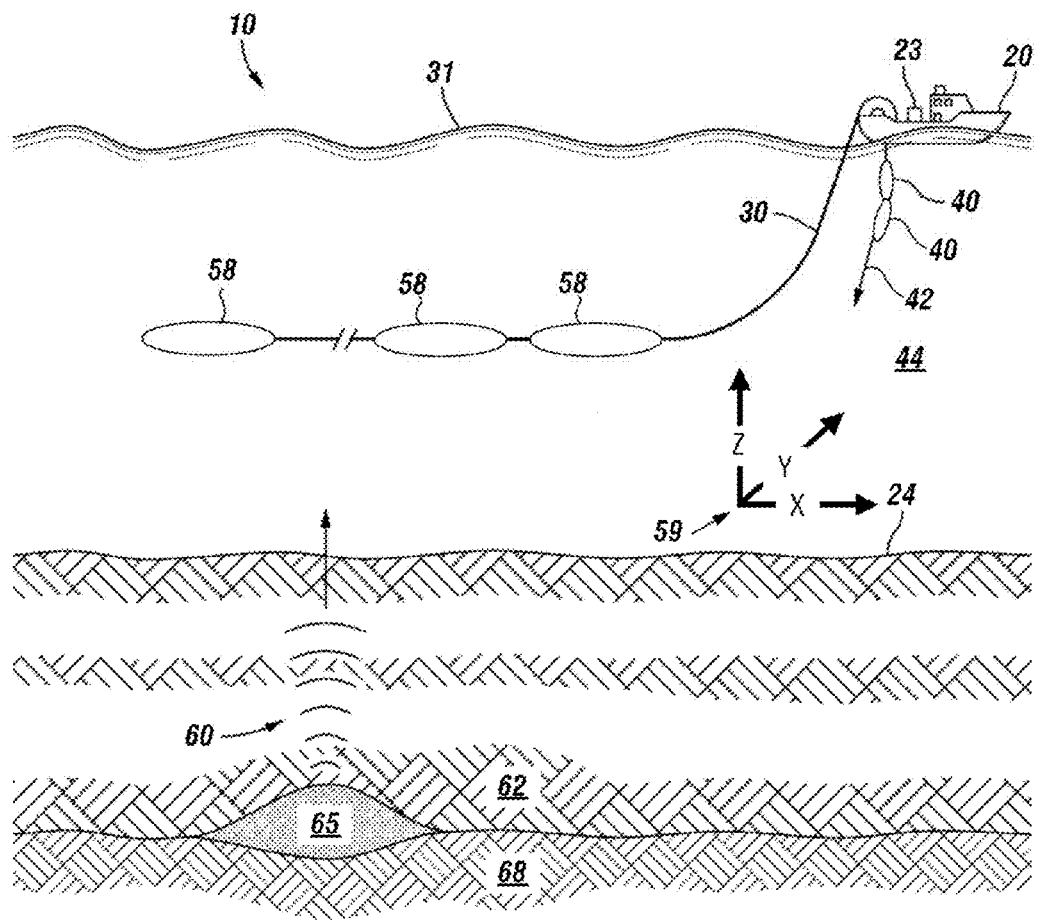
FIG. 1 illustrates a seismic acquisition system in a marine environment.

Reference will now be made in detail to embodiments, examples of which are illustrated in the accompanying drawings and figures. In the following detailed description, numerous specific details are set forth in order to provide a thorough understanding of the subject matter herein. However, it will be apparent to one of ordinary skill in the art that the subject matter may be practiced without these specific details. In other instances, well-known methods, procedures, components, and systems have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step. The first object or step, and the second object or step, are both objects or steps, respectively, but they are not to be considered the same object or step.

The terminology used in the description of the disclosure herein is for the purpose of describing particular embodiments only and is not intended to be limiting of the subject matter. As used in this description and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded or transmitted via any suitable means including memory sharing, message passing, token passing, network transmission, etc.

FIG. 1 depicts an embodiment 10 of a marine-based seismic data acquisition system. In the system 10, a survey vessel 20 tows one or more seismic streamers 30 (one streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which are mounted seismic sensors that record seismic signals. The streamers 30 contain seismic sensors 58, which may be hydrophones to acquire pressure data or multi-component sensors. For example, sensors 58 may be multi-component sensors, each sensor may be capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

The multi-component seismic sensor may include one or more hydrophones, geophones, particle displacement sensors, particle velocity sensors, accelerometers, pressure gradient sensors, or combinations thereof.

The marine seismic data acquisition system 10 includes one or more seismic sources 40 (two seismic sources 40 being depicted in FIG. 1), such as air guns and the like. The seismic sources 40 may be coupled to, or towed by, the survey vessel 20. The seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as a formation 65 that is depicted in FIG. 1.

The incident acoustic signals 42 that are generated by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection from the air-water boundary 31, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. It is noted that while the physical wavefield is continuous in space and time, traces are recorded at discrete points in space which may result in spatial aliasing. The traces are recorded and may be at least partially processed by a signal processing unit 23 that is deployed on the survey vessel 20, in accordance with some embodiments. For example, a particular seismic sensor 58 may provide a trace, which corresponds to a measure of a pressure wavefield by its hydrophone; and the sensor 58 may provide (depending the sensor configurations) one or more traces that correspond to one or more components of particle motion.

The goal of the seismic acquisition is to build up an image of a survey area for purposes of identifying subterranean geological formations, such as the geological formation 65. Subsequent analysis of the representation may reveal probable locations of hydrocarbon deposits in subterranean geological formations. Depending on the particular survey design, portions of the analysis of the representation may be performed on the seismic survey vessel 20, such as by the signal processing unit 23. In other surveys, the representation may be processed by a seismic data processing system (such as a seismic data processing system 600 in FIG. 6 and is further described below) that may be, for example, located on land or on the vessel 20.

A particular seismic source 40 may be formed from an array of seismic source elements (such as air guns, for example) that may be arranged in strings (gun strings, for example) of the array. A particular seismic source 40 may also be formed from one or a predetermined number of air guns of an array, or may be formed from multiple arrays, etc. Regardless of the particular composition of the seismic sources, the sources may be fired in a particular time sequence during the survey.

The seismic sources 40 may be fired in a sequence such that multiple seismic sources 40 may be fired simultaneously or near-simultaneously in a short interval of time so that a composite energy signal that is sensed by the seismic sensors 58 contains a significant amount of energy from more than one seismic source 40. In other words, the seismic sources interfere with each other such that the composite energy signal is not easily separable into signals that are attributable to the specific sources. This type of seismic survey is referred to as simultaneous sources survey. The composite data that are acquired by the seismic sensors 58 may be separated, as described below, into datasets that are each associated with one of the seismic sources 40 so that each dataset indicates the component of the composite seismic energy signal that is attributable to the associated seismic source 40.

In a non-simultaneous sources survey, a delay is introduced between the firing of one seismic source and the firing of the next seismic source, and the delay is sufficient to permit the energy that is created by the firing of one seismic source to decay to an acceptable level before the energy that is associated with the next seismic source firing arrives. The use of such delays, however, imposes constraints on the rate at which the seismic data may be acquired. For a towed marine survey, these delays also imply a minimum inline shot interval because the minimum speed of the survey vessel is a constraint.

Thus, the use of simultaneously-fired or near-simultaneously-fired seismic sources in which signals from the sources interfere for at least part of each record, has benefits in terms of acquisition efficiency and inline source sampling. However, for this technique to be useful, the acquired seismic data must be separated into the datasets that are each uniquely associated with one of the seismic sources.

There are various ways to separate acquired composite data into datasets that are uniquely associated with one of the seismic sources, for example, as disclosed in a pending U.S. patent application Ser. No. 11/964,402, ('402 application), filed on Dec. 26, 2007 by Ian Moore et al., titled "Separating seismic signals produced by interfering seismic sources;" U.S. patent application Ser. No. 12/256,135, filed on Oct. 22, 2008 by Ian Moore, titled "Removing seismic interference using simultaneous or near simultaneous source separation;" U.S. patent application Ser. No. 12/429,328, filed on Apr. 24, 2009 by Ian Moore et al., titled "Separating seismic signals produced by interfering seismic sources." All of the above patent applications are assigned to the same assignee as the current application. All of the above patent applications are hereby incorporated by reference.

The above applications use modeling and inversion based methods, such as Radon or high resolution Radon transformation to separate the composite data. For example, in '402 application, the separation problem is formulated into an optimization problem.

In one example discussed in '402 application, the seismic data vector d is acquired due to the near-simultaneous firing of two seismic sources called "$S_1$" and "$S_2$." For this example, the seismic sources $S_1$ and $S_2$ are fired pursuant to a timing sequence, which may be based on a predetermined timing pattern or may be based on random or pseudo-random time delays. Regardless of the particular timing scheme, it is assumed for this example that the seismic source $S_1$ is fired before the seismic source $S_2$ for relevant traces, and it is further assumed that the zero times of the traces correspond to the firing times for $S_1$ (S1-time). Thus, the zero times of the traces are in "$S_1$ time." The offsets, or vectors, to the seismic sources $S_1$ and $S_2$ are called "$x^1$" and "$x^2$," respectively. The timing delays, denoted by "t" for the seismic source $S_2$ are known for each trace.

It is assumed for this example that the collection of traces are such that the values of t are random. In practice, this is the case for a common mid-point (CMP), common receiver, or common offset gather. For purposes of simplifying this discussion, it is assumed that the trace in each gather may be located with respect to the seismic source $S_1$ and seismic source $S_2$ using scalar quantities called "$x^1_i$" and "$x^2_i$," respectively. In this notation, the subscript "i" denotes the trace number in the gather. A more specific example for a CMP gather: "$x^1_i$" may be the scalar offset to the seismic source $S_1$, and these quantities are referred to as offsets below. Similarly, "$t_i$" denotes the timing delay for the $i^{th}$ trace.

The recorded energy for the seismic source $S_1$ may be modeled by applying a linear operator called "$L_1$" (which represents the physics of the seismic source $S_1$, the wave propagation associated with the source $S_1$ and the survey geometry associated with the seismic source $S_1$) to an unknown model called "$m_1$", which describes the geology that affects the energy that propagates from the seismic source $S_1$. The model $m_1$ contains one element for each parameter in the model space. The model space may be parameterized by slowness or by its square, corresponding to linear or hyperbolic/parabolic Radon transforms, respectively. The linear operator $L_1$ is a function of the offsets to the source $S_1$, the parameters that characterize the model space, and time or frequency. A seismic data vector $d_1$ contains one element for each trace (at each time or frequency) and is the component of the seismic data d, which is associated with the seismic source $S_1$. In other words, the seismic data vector $d_1$ represents the dataset attributable to the seismic source $S_1$. The seismic data vector $d_1$ may be described as follows:

$$d_1 = L_1 m_1. \qquad \text{Eq. 1}$$

where:
operator matrix element $(L_s)_{jk} = e^{i\omega x_{sj} P_{sk}}$, wherein:
s can be 1 or 2, referring to source 1 or source 2;
j and k are the j'th row and k'th column of linear operator $L_s$;
$x_{sj}$ is the j'th offset to source s;
$P_{sk}$ is the k'th slowness of source s;
ω is angular frequency; and
i (in the exponent) is the square root of −1.

The energy that is associated with the seismic source $S_2$ appears incoherent in the seismic data vector d. However, the energy is related to a coherent dataset in which the firing times for the seismic source $S_2$ are at time zero (i.e., seismic source $S_2$ time) by the application of time shifts $t_i$ to the traces. A diagonal linear operator called "$D_2$" may be used for purposes of describing these time shifts, such that the component of the seismic data vector d, which is associated with the seismic source $S_2$ and which is called "$d_2$" may be described as follows:

$$d_2 = D_2 L_2 m_2. \qquad \text{Eq. 2}$$

where:
$(L_s)_{jk} = e^{i\omega x_{sj} P_{sk}}$, wherein:
s is 2 referring source 2;
j and k are the j'th row and k'th column of linear operator $L_s$;
$x_{sj}$ is the j'th offset to source s;
$P_{sk}$ is the k'th slowness of source s;
ω is angular frequency; and
i (in the exponent) is the square root of −1;
all of which are similar to $L_1$, and where $(D_2)_{jk} = e^{i\omega t_j} \delta_{jk}$ and $\delta_{jk}$ is the Kronecker delta function.

In Eq. 2, a linear operator called "$L_2$" represents the physics of the seismic source $S_2$, the wave propagation associated with the seismic source $S_2$ and the survey geometry associated with the seismic source $S_2$. Also in Eq. 2, a model called "$m_2$" describes the geology that affects the energy that propagates from the seismic source $S_2$.

The composite seismic energy signal that is recorded by the seismic sensors is attributable to both seismic sources $S_1$ and $S_2$. Thus, the seismic data vector d (i.e., the recorded data) is a combination of the seismic data vectors $d_1$ and $d_2$, as described below:

$$d = d_1 + d_2. \qquad \text{Eq. 3}$$

Due to the relationships in Eqs. 1, 2 and 3, the seismic data vector d may be represented as the following linear system:

$$d = \begin{bmatrix} L_1 & D_2 L_2 \end{bmatrix} \begin{bmatrix} m_1 \\ m_2 \end{bmatrix}. \qquad \text{Eq. 4}$$

Thus, Eq. 4 may be solved (i.e., jointly inverted) for the model vector m (i.e., $(m_1; m_2)$) using standard techniques, such as the least squares algorithm; after the model vector m is known, Eqs. 1 and 2 may be applied with the models $m_1$ and $m_2$ for purposes of separating the seismic data vector d into the seismic data vectors $d_1$ and $d_2$, i.e., into the datasets that indicate the measurements attributable to each seismic source.

The current application discloses methods with an approach that is different, more robust and efficient, and with methods that utilize existing linear optimization algorithms.

Using the same nomenclature, the simultaneous sources are source 1 and source 2 etc. There may be more than two sources, but for simplicity, only two sources are discussed. It is straightforward to include more than two sources.

For convenience of notation, assume that we use 2M+1 channels of data and 2L+1 numbers of frequencies. The actual number of channels and frequencies do not need to be odd numbers. The linear operator $L_1$ for source 1 and $D_2 L_2$ for source 2 may be represented by their basis functions, b, as in Eq. 5, below.

$$b = \begin{pmatrix} e^{-j2\pi f_{-L} u(p, x_{-M} - x_0, \tau_0)} \\ \vdots \\ e^{-j2\pi f_{-L} u(p, x_M - x_0, \tau_0)} \\ \vdots \\ e^{-j2\pi f_0 u(p, x_{-M} - x_0, \tau_0)} \\ \vdots \\ e^{-j2\pi f_0 u(p, x_M - x_0, \tau_0)} \\ \vdots \\ e^{-j2\pi f_L u(p, x_{-M} - x_0, \tau_0)} \\ \vdots \\ e^{-j2\pi f_L u(p, x_M - x_0, \tau_0)} \end{pmatrix} \qquad \text{Eq. 5}$$

where:

$x_{-M}, \ldots, x_0, \ldots, x_M$ are position vectors of 2M+1 channels of data;

the position vector can be the offset to the source location;

$f_{-L}, \ldots, f_0, \ldots, f_L$ are 2L+1 frequencies;

$\tau_0$ is the intercept time which represents the arrival time at position $x_0$ of an event or seismic wavefront with slowness p; and $u(p, x_i - x_0, \tau_0)$ is called the phase function, which is a function of slowness p, the relative position between sensor $x_i$ and the reference sensor $x_0$, and its arrival time (the intercept time $\tau_0$) at position $x_0$.

For convenience of notation, frequencies and positions are spread around a central frequency or position. The actual frequencies or positions do not need to be arranged in a symmetric fashion. Any arrangement is acceptable for the methods described here.

The phase function $u(p, x_i - x_0, \tau_0)$ may be a linear function, a hyperbolic function or another type of function, depending on the event reflected by subsurface structure. For example, in '402 application, the phase function is assumed to be a linear function, which is a good first order approximation. If an event is linear, the phase function may be expressed as:

$$u(p, x_i - x_0, \tau_0) = p \cdot (x_i - x_0) + \tau_0 \qquad \text{Eq. 6}$$

Or, if the event is hyperbolic, the phase function may be written as:

$$u(p, x_i - x_0, \tau_0) = \sqrt{(p \cdot (x_i - x_0)) + \tau_0^2} \qquad \text{Eq. 7}$$

More specifically, the frequency-diverse array response or steering vector at slowness, p, and frequency, $f_0$, for modeling the coherent source ($S_1$) can be written as in Eq. 8. Similarly, by taking into account the random delay time of $S_2$, $t = (t_{-M} \ldots t_0 \ldots t_M)^T$, the frequency-diverse array response or steering vector for modeling the incoherent source ($S_2$) can be written as in Equation 9, below.

$$g^{S_1}(p, \tau_0) = \begin{pmatrix} e^{-j2\pi f_{-L} u\left(p^{S_1}, x_{-M}^{S_1} - x_0^{S_1}, \tau_0^{S_1}\right)} \\ \vdots \\ e^{-j2\pi f_{-L} u\left(p^{S_1}, x_M^{S_1} - x_0^{S_1}, \tau_0^{S_1}\right)} \\ \vdots \\ e^{-j2\pi f_0 u\left(p^{S_1}, x_{-M}^{S_1} - x_0^{S_1}, \tau_0^{S_1}\right)} \\ \vdots \\ e^{-j2\pi f_0 u\left(p^{S_1}, x_M^{S_1} - x_0^{S_1}, \tau_0^{S_1}\right)} \\ \vdots \\ e^{-j2\pi f_L u\left(p^{S_1}, x_{-M}^{S_1} - x_0^{S_1}, \tau_0^{S_1}\right)} \\ \vdots \\ e^{-j2\pi f_L u\left(p^{S_1}, x_M^{S_1} - x_0^{S_1}, \tau_0^{S_1}\right)} \end{pmatrix} \qquad \text{Eq. 8}$$

$$g^{S_2}(p, \tau_0) = \begin{pmatrix} e^{-j2\pi f_{-L} u\left(p^{S_2}, x_{-M}^{S_2} - x_0^{S_2}, \tau_0^{S_2} + t_{-M}\right)} \\ \vdots \\ e^{-j2\pi f_{-L} u\left(p^{S_2}, x_M^{S_2} - x_0^{S_2}, \tau_0^{S_2} + t_M\right)} \\ \vdots \\ e^{-j2\pi f_0 u\left(p^{S_2}, x_{-M}^{S_2} - x_0^{S_2}, \tau_0^{S_2} + t_{-M}\right)} \\ \vdots \\ e^{-j2\pi f_0 u\left(p^{S_2}, x_M^{S_2} - x_0^{S_2}, \tau_0^{S_2} + t_M\right)} \\ \vdots \\ e^{-j2\pi f_L u\left(p^{S_2}, x_{-M}^{S_2} - x_0^{S_2}, \tau_0^{S_2} + t_{-M}\right)} \\ \vdots \\ e^{-j2\pi f_L u\left(p^{S_2}, x_M^{S_2} - x_0^{S_2}, \tau_0^{S_2} + t_M\right)} \end{pmatrix} \qquad \text{Eq. 9}$$

where:

$x_{-M}^{S_j}, \ldots, x_0^{S_j}, \ldots, x_M^{S_j}$ are offset to source j;

j=1, 2; and $p^{S_j}$ and $\tau_0^{S_j}$ are slowness and intercept time for source j, j=1, 2.

Assuming the same 2M+1 channels and 2L+1 number of frequencies of recorded data, d, can be written in vector form as equation 10, below.

We may also define and discretize the slowness into $N_p^{Sj}$ slowness, from $p_{min}^{Sj}$ to $p_{max}^{Sj}$ for each source j, j=1, 2; similarly, the intercept time can be defined and discretized into $N_{\tau 0}^{Sj}$ time, from $\tau_0^{Sj,min}$ to $\tau_0^{Sj,max}$ for each source j, j=1, 2. The resulting models for the two sources $m^{S1}$ and $m^{S2}$ are as in Eq. 12 and Eq. 13 and the combined model m is as written in Eq. 11.

$$d = \begin{pmatrix} d_{-M}(f_{-L}) \\ \vdots \\ d_M(f_{-L}) \\ \vdots \\ d_{-M}(f_0) \\ \vdots \\ d_M(f_0) \\ \vdots \\ d_{-M}(f_L) \\ \vdots \\ d_M(f_L) \end{pmatrix} \qquad \text{Eq. 10}$$

and $$m = \begin{pmatrix} m^{S_1} \\ m^{S_2} \end{pmatrix} \qquad \text{Eq. 11}$$

$$m^{S_1} = \begin{pmatrix} m^{S_1}(p_1^{S_1}, \tau_0^{S_1,1}) \\ \vdots \\ m^{S_1}(p_1^{S_1}, \tau_0^{S_1,N_{\tau 0}^{S_1}}) \\ \vdots \\ m^{S_1}(p_{N_p^{S_1}}^{S_1}, \tau_0^{S_1,1}) \\ \vdots \\ m^{S_1}(p_{N_p^{S_1}}^{S_1}, \tau_0^{S_1,N_{\tau 0}^{S_1}}) \end{pmatrix} \qquad \text{Eq. 12}$$

and $$m^{S_2} = \begin{pmatrix} m^{S_2}(p_1^{S_2}, \tau_0^{S_2,1}) \\ \vdots \\ m^{S_2}(p_1^{S_2}, \tau_0^{S_2,N_{\tau 0}^{S_2}}) \\ \vdots \\ m^{S_2}(p_{N_p^{S_2}}^{S_2}, \tau_0^{S_2,1}) \\ \vdots \\ m^{S_2}(p_{N_p^{S_2}}^{S_2}, \tau_0^{S_2,N_{\tau 0}^{S_2}}) \end{pmatrix} \qquad \text{Eq. 13}$$

We assume that the recorded data, d, can be modeled by using a set of basis functions for the coherent source ($S_1$) defined as Eq. 8 with different slownesses and different arrival times at sensor, $x_0$, for each slowness, and another set of basis functions for the incoherent source ($S_2$), defined as Eq. 9 with different slownesses and different arrival times at sensor $x_0$ for each slowness. The linear operator matrix A may be constructed as shown in Eq. 14:

$$A = \begin{pmatrix} g^{S_1}(p_1, \tau_0^1) & \cdots & g^{S_1}\left(p_{N_p^{S_1}}, \tau_0^{N_{\tau 0}^{S_1}}\right) \\ g^{S_2}(p_1, \tau_0^1) & \cdots & g^{S_2}\left(p_{N_p^{S_2}}, \tau_0^{N_{\tau 0}^{S_2}}\right) \end{pmatrix} \qquad \text{Eq. 14}$$

where $g^{S_1}(\bullet)$ and $g^{S_2}(\bullet)$ are defined in Eq. 8 and Eq. 9, respectively.

Once the linear operator matrix A is constructed from the basis functions for source 1 and source 2 and model vectors for sources 1 and 2, the data separation problem may be converted to an optimization problem, e.g., a one-norm or zero-norm optimization problem, similar to that as in '402 application, as written in Eq. 4. More specifically, the decomposition problem may be written as $$\min \|m\|_1 \text{ or } \min \|m\|_0 \text{ subject to } \|Am-d\|_2 \leq \epsilon \qquad \text{Eq. 15}$$

Once the model m is solved from this optimization problem in Eq. 15, computing the separated data due to source 1 or 2 is straightforward, as in Eqs. 16 and 17, which are similar to Eqs. 1 and 2.

$$d^{S_1} = A^{S_1} m^{S_1} \qquad \text{Eq. 16}$$

where:

$$d^{S_1} = \begin{pmatrix} d_{-M}^{S_1}(f_0) \\ \vdots \\ d_M^{S_1}(f_0) \end{pmatrix} \qquad \text{Eq. 16a}$$

$$A^{S_1} = \begin{pmatrix} e^{-j2\pi f_0 u\left(p_1^{S_1}, x_{-M}^{S_1} - x_0^{S_1}, \tau_0^{S_1,1}\right)} & \cdots & e^{-j2\pi f_0 u\left(p_1^{S_1}, x_{-M}^{S_1} - x_0^{S_1}, \tau_0^{S_1,N_{\tau 0}^{S_1}}\right)} & \cdots & e^{-j2\pi f_0 u\left(p_{N_p^{S_1}}^{S_1}, x_{-M}^{S_1} - x_0^{S_1}, \tau_0^{S_1,N_{\tau 0}^{S_1}}\right)} \\ \vdots & \ddots & \vdots & \ddots & \vdots \\ e^{-j2\pi f_0 u\left(p_1^{S_1}, x_M^{S_1} - x_0^{S_1}, \tau_0^{S_1,1}\right)} & \cdots & e^{-j2\pi f_0 u\left(p_1^{S_1}, x_M^{S_1} - x_0^{S_1}, \tau_0^{S_1,N_{\tau 0}^{S_1}}\right)} & \cdots & e^{-j2\pi f_0 u\left(p_{N_p^{S_1}}^{S_1}, x_M^{S_1} - x_0^{S_1}, \tau_0^{S_1,N_{\tau 0}^{S_1}}\right)} \end{pmatrix} \qquad \text{Eq. 16b}$$

and $$d^{S_2} = A^{S_2} m^{S_2} \qquad \text{Eq. 17}$$

where:

$$d^{S_2} = \begin{bmatrix} d^{S_2}_{-M}(f_0) \\ \vdots \\ d^{S_2}_{M}(f_0) \end{bmatrix}$$ Eq. 17a $A^{S_2} =$ Eq. 17b $$\begin{pmatrix} e^{-j2\pi f_0 u\left(p_1^{S_2}, x_{-M}^{S_2} - x_0^{S_2}, \tau_0^{S_2,1} + t_{-M}\right)} & \cdots & e^{-j2\pi f_0 u\left(p_1^{S_2}, x_{-M}^{S_2} - x_0^{S_2}, \tau_0^{S_2,N_{\tau 0}^{S_2}} + t_{-M}\right)} & \cdots & e^{-j2\pi f_0 u\left(p_{N_{p2}}^{S_2}, x_{-M}^{S_2} - x_0^{S_2}, \tau_0^{S_2,N_{\tau 0}^{S_2}} + t_{-M}\right)} \\ \vdots & \ddots & \vdots & \ddots & \vdots \\ e^{-j2\pi f_0 u\left(p_1^{S_2}, x_M^{S_2} - x_0^{S_2}, \tau_0^{S_2,1} + t_M\right)} & \cdots & e^{-j2\pi f_0 u\left(p_1^{S_2}, x_M^{S_2} - x_0^{S_2}, \tau_0^{S_2,N_{\tau 0}^{S_2}} + t_M\right)} & \cdots & e^{-j2\pi f_0 u\left(p_{N_{p2}}^{S_2}, x_M^{S_2} - x_0^{S_2}, \tau_0^{S_2,N_{\tau 0}^{S_2}} + t_M\right)} \end{pmatrix}$$

The above decomposition problem, or one-norm or zero-norm optimization problem in Eq. 15, looks very similar to the formulated problem in Eq. 4 as in '402 application. In reality, the similarity is only in the form and the standard algorithms or solvers that may be used to solve such one-norm or zero-norm optimization problem in Eq. 15 here or Eq. 4 as in '402 application. Because the basis functions are different, the phase functions are different and the separation results are different.

In this method, the basis functions are expanded to include multiple frequencies. This is equivalent to filtering the central frequency $f_0$ by using the frequencies around the central frequency, hence the phrase "frequency diverse" in referring to this method. The model space may include multiple slownesses between the maximum and minimum slowness $p_{max}$ to $p_{min}$ and multiple times between a range of intercept time maximum $\tau_0^{max}$ and minimum $\tau_0^{min}$.

Similarly, in this method, the model space m is related to both slowness p and intercept time $\tau_0$ at the reference trace $x_0$. The multiple intercept time $\tau_0$ included is used to correct the phases of the multiple frequencies in the basis function as defined in Eq. 5.

Because of the frequency diversities in the basis functions, this method can process data regardless whether the data are aliased or not. This property makes this method very useful for aliased data, because most other separation methods have difficulties in separating data if the data are aliased as a result of spatial sampling limitations.

In this method, the phase function may be selectable based on the targeted events reflected from the subsurface structures. More appropriate phase functions, e.g., linear or hyperbolic, may be used to closely conform to the event curvature to avoid data loss during the data separation process, e.g., for events from high-dip structures.

The one-norm or zero-norm optimization problem is constructed for each frequency (also referred to as reference frequency $f_0$) in the acquired composite data. Once the data in one frequency are separated, the data with another frequency are selected. The central frequency (or the reference frequency) is shifted and the process repeated until relevant frequencies in the dataset are filtered. Separated frequency-space data at relevant frequencies may be combined, and then transformed back to the time-space domain to form the separated data in the time-space domain.

In this method, basis functions are localized in time and frequency or in time, frequency and space. There is no assumption on source signatures. In general, it is not equivalent to applying a band-pass filter or source signature to the time domain Radon transform, because the sidelobes of the filter or mismatch of the source signature may make the model less sparse.

Figure 2:
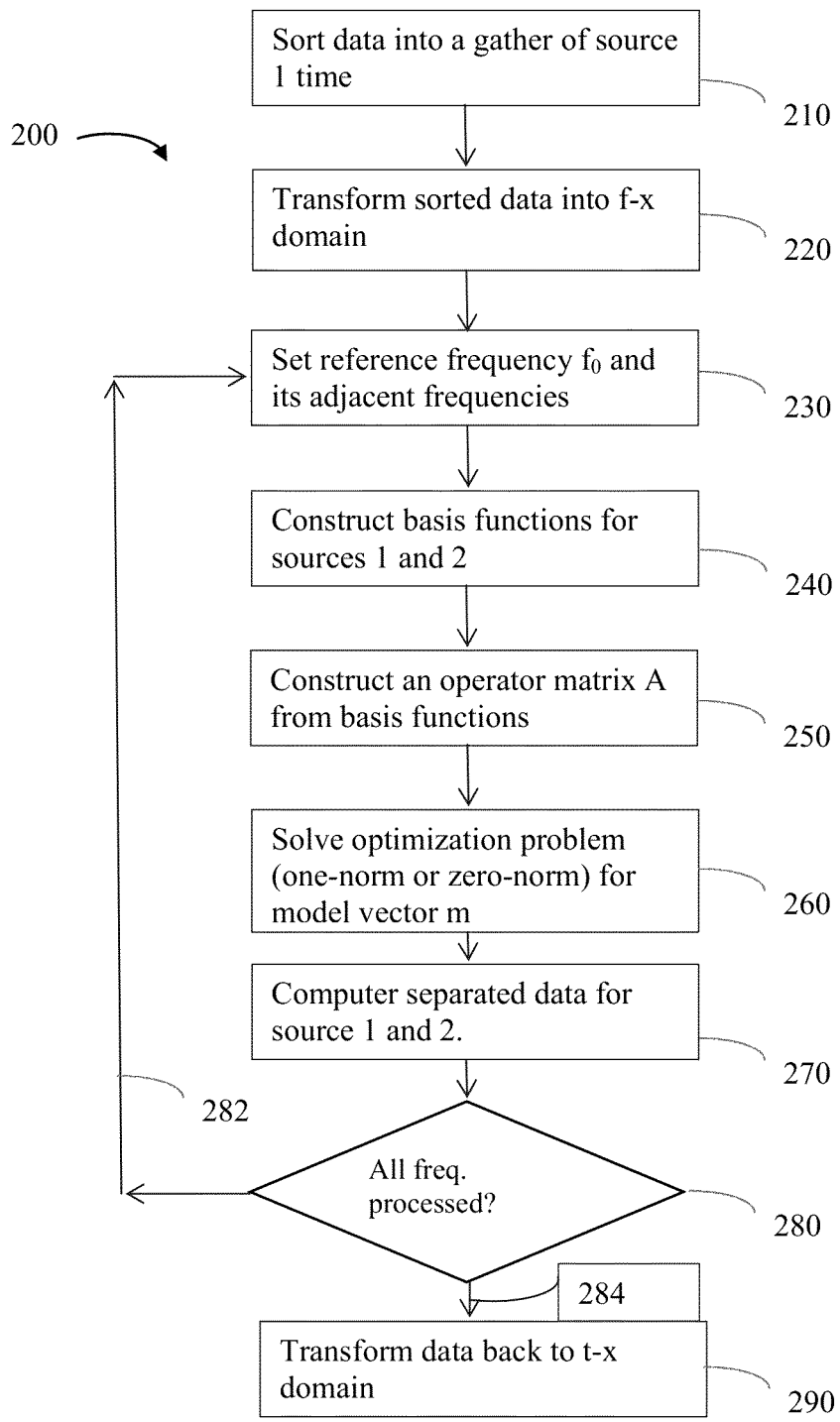
FIG. 2 illustrates a flow diagram of an example method used to separate simultaneous source data by a frequency diverse de-aliasing filter.

The method described above may be summarized in a flow diagram as shown in FIG. 2. The simultaneous source separation method 200 may proceed as follows:

sort the composite data into a gather where one of the sources appears to be coherent and the other to be incoherent (210);

transform the data from time-space domain into frequency-space domain (220);

set a reference frequency $f_0$ to a first frequency of the transformed data and select its adjacent frequencies (230) (the total number of different $f_0$ frequencies is the same total number of frequencies in the transformed data);

compute the multi-frequency basis functions (240), one set each for source 1 and source 2 respectively, for example as described by Eq. 8 and Eq. 9;

construct an operator matrix A from the two sets of basis functions (250); for example as in Eq. 14;

solve an optimization problem (260), for example the one-norm or zero-norm problem m for Am–d, for example, as expressed Eq. 15;

compute the separated data $d^{S_1}$, $d^{S_2}$ using the optimized array $m^{S_1}$, $m^{S_2}$, and the two sets of basis functions for source 1 and source 2 (270), for example, as in Eq. 16 and Eq. 17;

check whether relevant frequencies in the data set are processed (280);

if not, then go to (282), repeat operations from (230) to (270), processing data at another reference frequency $f_0$ until relevant frequencies in the data have been processed;

if yes, then go to (284), the data separation in the frequency-space domain is done;

transform the separated data $d_1$ and $d_2$ in the frequency-space domain back to the time-space domain with two separated datasets (290).

Depending on the composite dataset conditions, for example the events in the dataset, not all operations may be necessary or performed in the sequence as listed above. Some variations may be used for various purposes. For example, at (230), in selecting data at reference frequency $f_0$, more data for frequencies above and below reference frequency $f_0$ may also be selected. So, data with a few more frequencies than necessary are also going through the optimization process, e.g. the one-norm or zero-norm optimization process. Once the model vectors m are determined, data $d^{S_1}$, $d^{S_2}$ at reference frequency $f_0$, are computed from composite data d. The separated data $d^{S_1}$, $d^{S_2}$ at reference frequency $f_0$ are included with separated data at other frequencies to form the separated data in the frequency-space domain.

It is possible to only select data at the reference frequency $f_0$ without data at neighboring frequencies at (230). It may reduce the amount of computation in (260), but it may also introduce some computational artifacts.

In the above example, the separated data from the method 200 are dataset 1, due to source 1 at source 1 time (S1), and dataset 2, due to source 2 at source 1 time (S1). Dataset 1 is in its native time, i.e. dataset 1 is coherent. It may be useful to realign the dataset 2 to source 2 time (S2) such that the dataset 2 is coherent as well.

This method 200 converts a data separation problem for simultaneous sources into a standard one-norm or zero-norm optimization problem. The one-norm or zero-norm optimization problem is well known, well researched, and well developed. There are many efficient and cost effective algorithms that can be used. The cost of the method 200 is mainly the cost of solving the one-norm or zero-norm optimization problem in (260) described above.

In the above example, the method 200 is used to separate data from two sources. The method 200 can be extended readily to more than two sources by simply making the matrix A and model m contain more basis functions corresponding to additional sources. The model vector m and the operator matrix A may have greater dimensions. The dataset due to other sources may also need to be re-aligned to their native source times to make the dataset coherent. The method of separation is identical, whether there are two sources or more.

The methods described in this application are based on frequency diverse de-aliasing filter, so it may be combined with other methods based on other principles for better source separation. Once the separated datasets due to different sources are obtained, the datasets may be further processed for various purposes, or the datasets may be used to generate an image an interior of the Earth.

Figure 3:
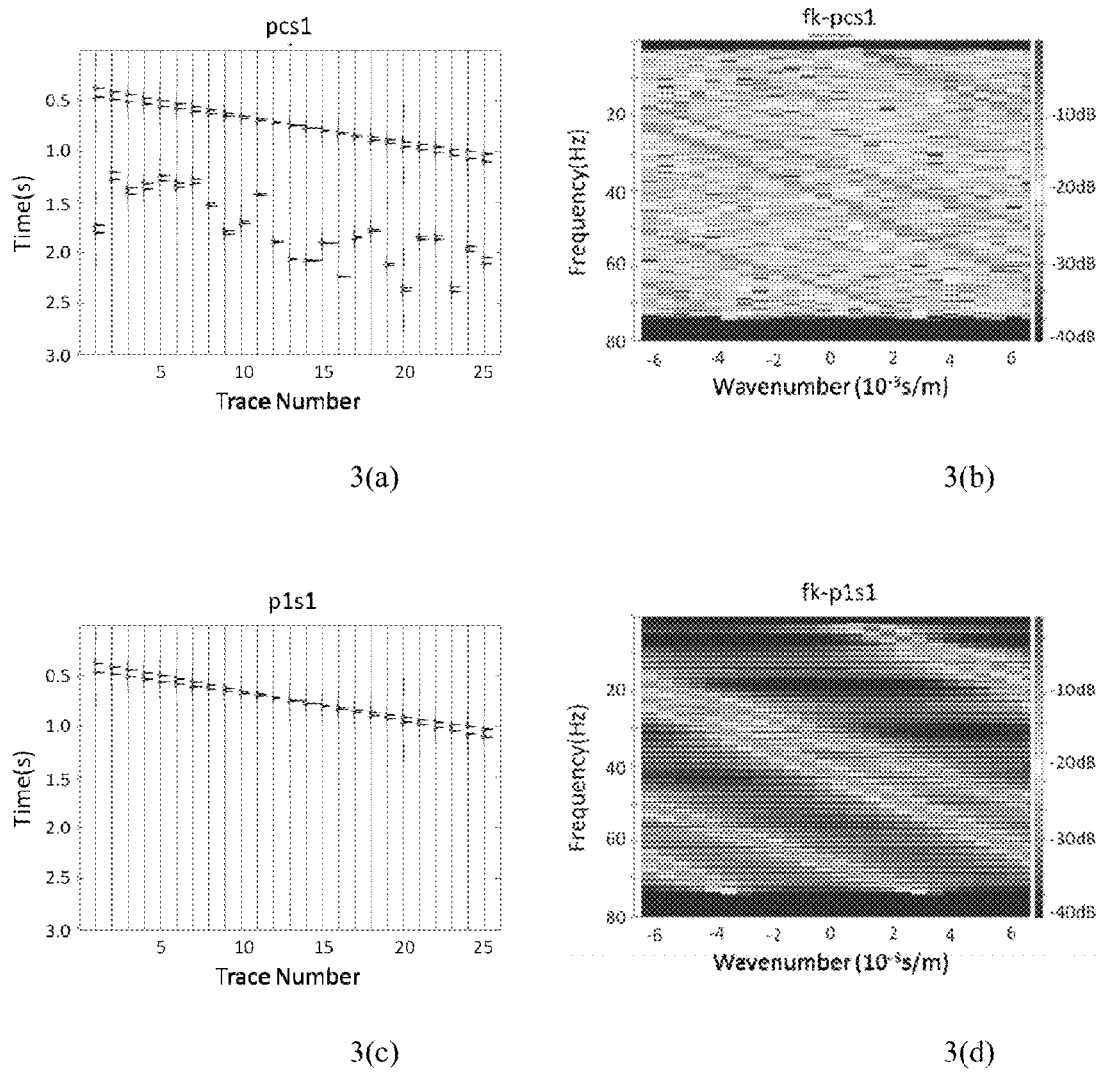
FIGS. 3a-3h illustrate an example of synthetic composite data, the separated data, and comparisons in a space-time domain and an associated wavenumber-frequency domain.
Figure 3:
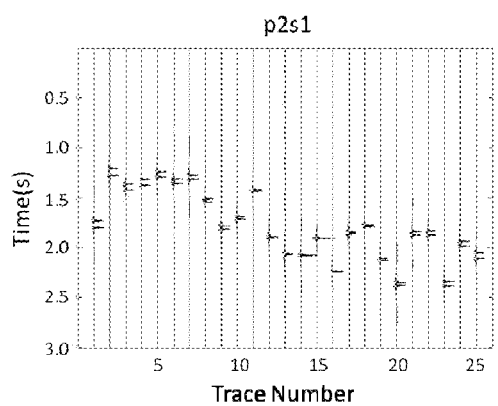
Figure 3:
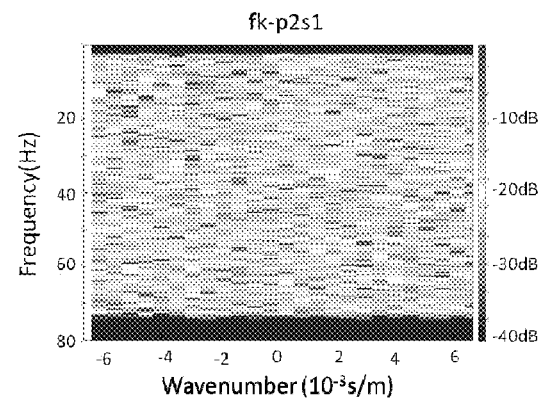
Figure 3:
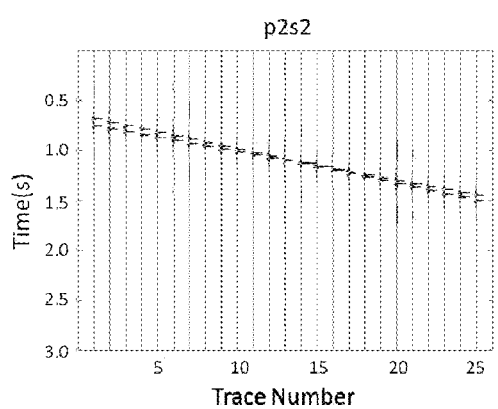
Figure 3:
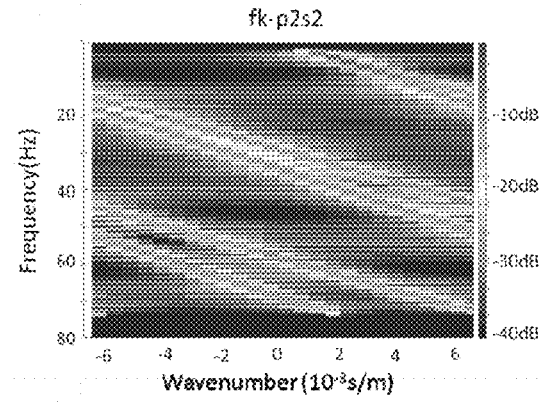
Figure 4:
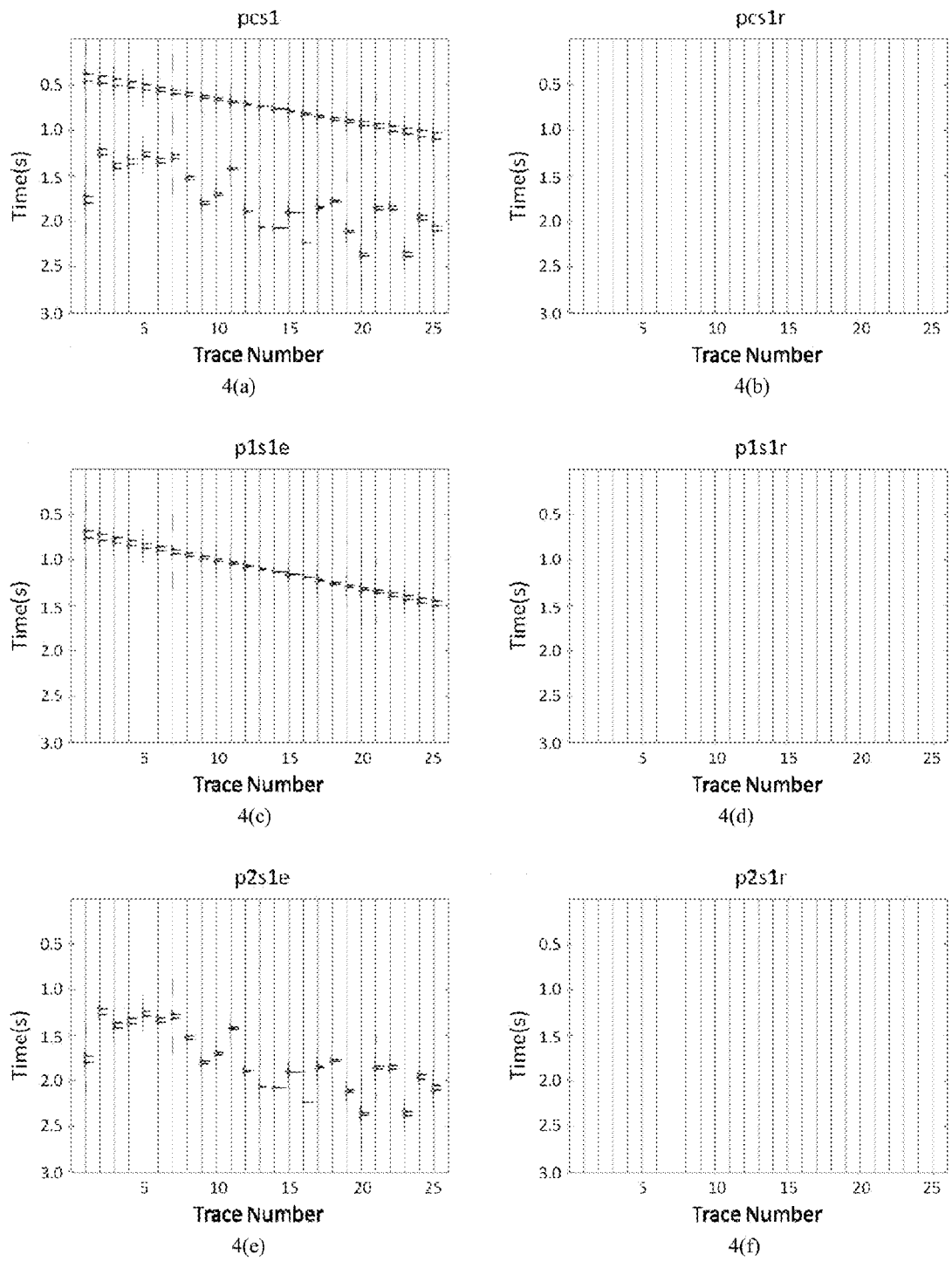
FIGS. 4a-4f illustrate separated data for the example as in FIG. 3.
Figure 5:
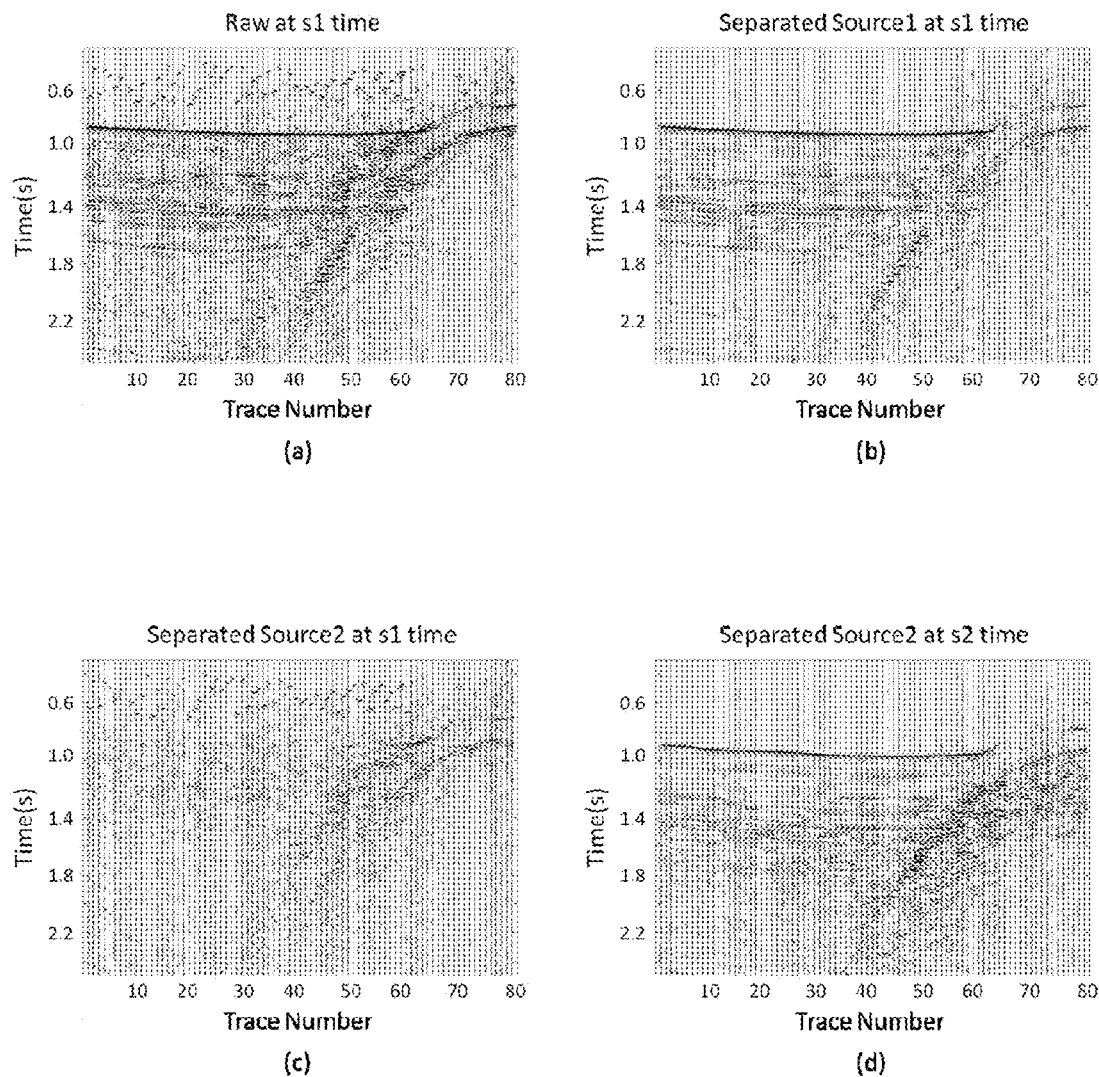
FIGS. 5a-5d illustrate an example of actual acquired raw composite data from simultaneous sources and the separated data.

FIGS. 3-5 illustrate some data examples of using the methods described above.

FIGS. 3a-3h illustrate an example of a synthetic dataset used to test a separation method described above. The combined recorded data (pcs1) as in FIG. 3a for the separation process were created by adding two synthetic aliasing linear events corresponding to each of the two sources (p1s1 and p2s1). In this example, the source interval of the synthetic data is 75 m and the frequency range is 3-80 Hz. The f-k spectra of the composite data (fk-pcs1) are illustrated in FIG. 3b. The source 1 data in time-space domain (p1s1) and its corresponding data in frequency-wavenumber domain in $S_1$-time (fk-p1s1) are shown in FIGS. 3c and 3d respectively. The source 2 data in time-space domain (p2s2) and its corresponding data in frequency-wavenumber domain in S2-time (fk-p2s2) are shown in FIGS. 3g and 3h respectively. In S2 time, the data recorded from source S2 are coherent. The source 2 data, in time-space domain (p2s1) but in S1 time, and its corresponding data in frequency-wavenumber domain in S1-time (fk-p2s1), are shown in FIGS. 3e and 3f respectively. In FIGS. 3e and 3f, due to the timing that is aligned to S1 time, the shooting time of source 2 at each trace has a time delay which appears to be random. It may be seen in the frequency-wavenumber domain, as in FIGS. 3b, 3d and 3h that the two linear events in source 1 and source 2 are aliasing.

The separation process tries to recover p1s1 (FIG. 3c) and p2s1 (FIG. 3e) from the composite data pcs1 (FIG. 3a). FIGS. 4a-4f illustrate the separation results. FIG. 4a is the composite data and FIG. 4b is the residue. FIGS. 4c and 4d illustrate the separated data p1s1e for source 1 in source 1 time and its residue; and FIGS. 4e and 4f illustrate the separated data p2s1e for source 2 in source 1 time and its residue. The resulting estimates (p1s1e and p2s1e) appear near-perfect in this case. The residual of separation (pcs1r=pcs1−p1s1e−p2s1e) as in FIG. 4b is small (less than −40 dB), indicating that nearly all the energy in the input data appears in either p1s1e or p1s2e. The source estimation errors, p1s1r=p1s1−p1s1e and p2s1r=p2s1−p2s1e, are also small (less than −40 dB), indicating that the two sources were nearly perfectly separated. The original data pcs1, p1s1, p2s1 are the data as shown in FIGS. 3a, 3c and 3e.

Testing on noisy synthetic data has shown that the above described method is robust as to random noise. In some tests, up to 10% random noise was added into the input data (pcs1), and separations were still successful.

FIGS. 5a-5d illustrate another example with an actual acquired seismic marine dataset. FIG. 5a shows the raw data in s1 time. The shot interval in this example dataset is 75 m. The amplitude varies greatly because of the complex geological structure. FIG. 5b shows the separated source 1 in S1-time, FIG. 5c shows the separated source 2 in $S_1$-time, and FIG. 5d shows the separated source 2 in $S_2$-time. The separated datasets FIGS. 5b and 5d at their respectively times show wavefields from subsurface structures.

As those with skill in the art will understand, one or more of the steps of methods discussed above may be combined and/or the order of some operations may be changed. Further, some operations in methods may be combined with aspects of other example embodiments disclosed herein, and/or the order of some operations may be changed. The process of measurement, its interpretation, and actions taken by operators may be done in an iterative fashion; this concept is applicable to the methods discussed herein. Finally, portions of methods may be performed by any suitable techniques, including on an automated or semi-automated basis on computing system 600 in FIG. 6.

Figure 6:
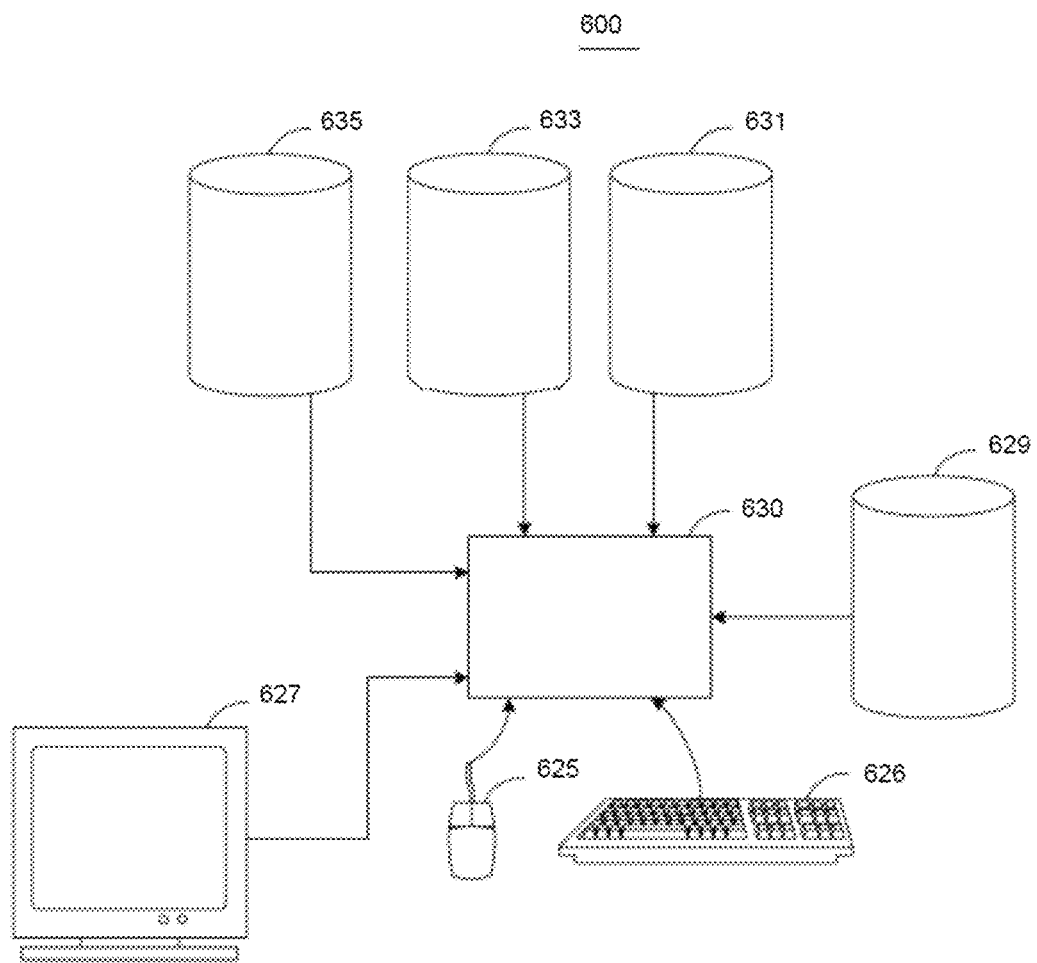
FIG. 6 illustrates a schematic view of a computer system where some methods disclosed can be implemented.

Portions of methods described above may be implemented in a computer system 600, one of which is shown in FIG. 6. The system computer 630 may be in communication with disk storage devices 629, 631, 633 and 635, which may be external hard disk storage devices and measurement sensors (not shown). It is contemplated that disk storage devices 629, 631, 633 and 635 are conventional hard disk drives, and as such, may be implemented by way of a local area network or by remote access. While disk storage devices are illustrated as separate devices, a single disk storage device may be used to store any and all of the program instructions, measurement data, and results as desired.

In one implementation, real-time data from the sensors may be stored in disk storage device 631. Various non-real-time data from different sources may be stored in disk storage device 633. The system computer 630 may retrieve the appropriate data from the disk storage devices 631 or 633 to process data according to program instructions that correspond to implementations of various techniques described herein. The program instructions may be written in a computer programming language, such as C++, Java and the like. The program instructions may be stored in a computer-readable medium, such as program disk storage device 635. Such computer-readable media may include computer storage media. Computer storage media may include volatile and non-volatile media, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 630. Combinations of any of the above may also be included within the scope of computer readable media.

In one implementation, the system computer 630 may present output primarily onto graphics display 627, or via printer 628 (not shown). The system computer 630 may store the results of the methods described above on disk storage 629, for later use and further analysis. The keyboard 626 and the pointing device (e.g., a mouse, trackball, or the like) 625 may be provided with the system computer 630 to enable interactive operation.

The system computer 630 may be located on-site, e.g., as part of processing unit 23 on-board a vessel 20 as in FIG. 1 or at a data center remote from the field. The system computer 630 may be in communication with equipment on site to receive data of various measurements. Such data, after conventional formatting and other initial processing, may be stored by the system computer 630 as digital data in the disk storage 631 or 633 for subsequent retrieval and processing in the manner described above. While FIG. 6 illustrates the disk storage, e.g., 631 as directly connected to the system computer 630, it is also contemplated that the disk storage device may be accessible through a local area network or by remote access. Furthermore, while disk storage devices 629, 631 are illustrated as separate devices for storing input data and analysis results, the disk storage devices 629, 631 may be implemented within a single disk drive (either together with or separately from program disk storage device 633), or in any other conventional manner as will be fully understood by one of skill in the art having reference to this specification.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method for separating simultaneous source composite data containing data responses to at least two sources, the method comprising:
   receiving composite data from a plurality of seismic receivers, wherein the composite data is generated by the at least two sources in a seismic survey;
   using a computer to read a computer readable non-transitory medium having a computer program stored thereon, wherein the computer program comprises computer readable instructions for:
   1) sorting the composite data into gathers aligned with a first source of the at least two sources in a time-space domain;
   2) transforming the composite data from the time-space domain into a frequency-space domain;
   3) setting a reference frequency to a first frequency in the composite data in the frequency-space domain and selecting a plurality of adjacent frequencies to the reference frequency;
   4) forming multi-frequency basis functions, one set for each of the at least two sources;
   5) forming an operator matrix A from the basis functions, wherein operator matrix A contains matrices $A^{S_1}$ and $A^{S_2}$ corresponding to the first source and a second source of the at least two sources respectively;
   6) solving an optimization problem of Am−d to derive model vector m, wherein:
      the optimization problem of Am−d comprises
      $\min\|m\|_1$ or $\min\|m\|_0$ subject to $\|Am-d\|_2 \leq \epsilon$; and
      d is the data, and model vector m contains $m^{S_1}$ and $m^{S_2}$ representing each of the at least two sources;
   7) deriving separated source data for the first source, wherein the separated data is the product of the source vector $m^{S_1}$ and the operator matrix $A^{S_1}$;
   8) repeating 3) to 7) until each frequency in the composite data in the frequency-space domain are used as a reference frequency; and
   9) transforming the separated data from frequency-space domain into time-space domain.

2. The method of claim 1, further comprising:
   10) using the separated data to generate an image an interior of the Earth.

3. The method of claim 1, wherein the optimization problem is a one-norm or a zero-norm optimization problem.

4. The method of claim 1, further comprising:
   10) deriving separated source data for the second source, wherein the separated data is the product of the source vector $m^{S_2}$ and the operator matrix $A^{S_2}$.

5. The method of claim 3, further comprising:
   11) sorting separated data due to a source other than the first source into gathers align with the corresponding source time.

6. The method of claim 1, wherein the basis functions for sources comprises a plurality of slownesses.

7. The method of claim 1, wherein the basis functions for sources comprises a plurality of intercept times for each slowness.

8. The method of claim 1, wherein the basis functions for sources comprises a phase function.

9. The method of claim 8, wherein the phase function comprises a linear function.

10. The method of claim 8, wherein the phase function comprises a hyperbolic function.

11. The method of claim 1, wherein the composite data comprises aliased data.

12. The method of claim 1, wherein the source composite data contains data responses to three sources and the method further comprises:
    forming the operator matrix A from the basis functions, wherein operator matrix A contains matrix $A^{S_3}$ corresponding to a third source in addition to $A^{S_1}$ and $A^{S_2}$ corresponding to the first and second sources respectively;
    solving an optimization problem of Am−d to derive model vector m, wherein d is the data, and model vector m contains $m^{S_3}$ representing the third source in addition to $m^{S_1}$ and $m^{S_2}$ representing each of the at least two sources; and
    deriving separated source data for the third source, wherein the separated data are the product of the source vector $m^{S_3}$ and the operator matrix $A^{S_3}$.

13. An apparatus for acquiring and separating simultaneous source data by frequency diverse filtering, where the composite simultaneous source data contains responses to at least two sources, the system comprising:
- at least two sources;
- a plurality of receivers; and
- a controller containing at least one processor and at least one computer readable storage and configured to communicate with the sources and the receivers; wherein:
- the computer readable storage comprises computer executable instructions, which when executed by the processor, causes the controller to:
  - activate a first set of the at least two sources and a second set of the at least two sources with a time delays between the activation of the first and second sets of the at least two sources, the first and the second sets of the at least two sources comprising at least one source;
  - acquire composite data from receivers and store the composite data in the at least one computer readable storage; and
- the processor is configured to convert the composite data into a one-norm (11) or zero-norm (10) optimization problem, the solution of which is decomposed data associated with each source.

14. The apparatus of claim 13, wherein converting the composite data into a one-norm (11) or zero-norm (10) optimization problem, the solution of which is decomposed data associated with each source, comprises:
1) sorting the composite data into gathers aligned with a source 1 in time-space domain;
2) transforming composite data from time-space domain into frequency-space domain;
3) set a reference frequency to a first frequency in the composite data in frequency-space domain and selecting a plurality of adjacent frequencies to the reference frequency;
4) form multi-frequency basis functions, one set for each of the at least two sources;
5) form an operator matrix A from the basis functions, wherein operator matrix A contains matrices $A^{S_1}$ and $A^{S_2}$ corresponding to sources 1 and 2 respectively;
6) solve an optimization problem of Am−d to derive model vector m, wherein:
the optimization problem of Am−d comprises
$\min\|m\|_1$ or $\min\|m\|_0$ subject to $\|Am-d\|_2 \le \epsilon$; and
d is the data, and model vector m contains $m^{S_1}$ and $m^{S_2}$ representing each of the at least two sources;
7) derive separated source data for source 1, wherein the separated data are the product of the source vector $m^{S_1}$ and the operator matrix $A^{S_1}$;
8) repeat 3) to 7) until relevant frequencies in the composite data in frequency-space domain are used as a reference frequency; and
9) transform separated data from frequency-space domain into time-space domain.

15. The apparatus of claim 13, further comprising a towing vessel, wherein the controller is onboard the vessel.

16. The apparatus of claim 12, further comprising:
10) deriving separated source data for source 2, wherein the separated data is the product of the source vector and the operator matrix.

17. The apparatus of claim 15, further comprising:
11) sorting separated data due to a source other the source 1 into gathers aligned with the corresponding source time.

18. The apparatus of claim 15, further comprising:
a seismic processor configured to generate an image of an interior of the Earth from the decomposed data.

19. The apparatus of claim 17, wherein the controller comprises the seismic processor.

* * * * *